Figure 1:
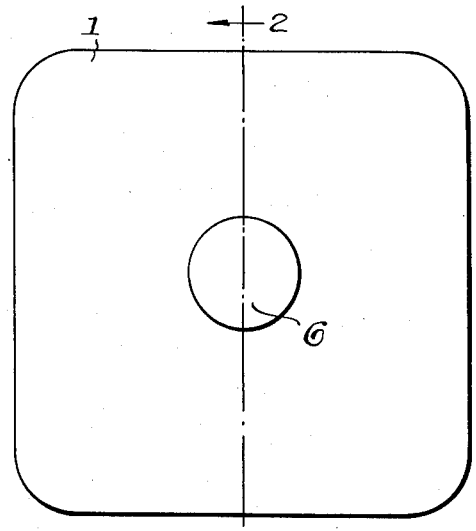

March 12, 1963    J. J. COLEMAN ETAL    3,081,369
MAGNESIUM BATTERY
Filed Aug. 2, 1960

Inventors,
Joseph J. Coleman
and Milton E. Wilke,
Jones, Darbo & Robertson, Attys.

United States Patent Office 3,081,369
Patented Mar. 12, 1963

3,081,369
MAGNESIUM BATTERY
Joseph J. Coleman and Milton E. Wilke, Freeport, Ill., assignors to Servel, Inc., Evansville, Ind., a corporation of Delaware
Filed Aug. 2, 1960, Ser. No. 47,073
13 Claims. (Cl. 136—87)

This invention relates to primary electric batteries, and more particularly refers to batteries comprised of wafer-type or flat-type cells having magnesium anodes.

Primary batteries having wafer-type or flat-type cells have almost supplanted batteries comprised of cylindrical cells, especially for applications where size is an important factor, since depolarizer elements in the form of flat cakes have proven to be much more efficient than cylindrical elements. Moreover, flat cells may be so stacked in a rectangular space that substantially all of the space is utilized by active ingredients. Cylindrical cells, in contrast, when stacked upon one another, cause an inherent waste of space due to the curvature of the cells.

In an effort to increase battery capacity for a given size, numerous attempts have been made in the past to utilize magnesium as an anodic material in place of zinc. At first glance, magnesium would appear to be ideally suited as an anodic material. One of its most desirable attributes is high electromotive potential. The high electromotive potential of magnesium permits fewer cells to be used to attain the same overall battery potential. The individual cells may as a result be made larger to incorporate a larger amount of active ingredients. Alternatively, a battery with magnesium anodes may be made in a smaller size while retaining the same electrical capacity as a larger zinc battery.

An additional desirable attribute of magnesium as an anodic material is its ability to provide more electrical energy per unit weight, since magnesium, in addition to having a high electromotive potential, is one of the lightest metals. This makes it ideal for use in such applications as the powering of meteorological equipment carried aloft by balloons, and for other applications where weight is an important factor.

Because magnesium reacts readily with most aqueous electrolytes, its use in batteries of the primary type has not been entirely successful. The high reactivity causes excessive anodic dissolution, and introduces serious cell leakage problems. As a further difficulty, magnesium salts are formed in large quantities during discharge, causing substantial volumetric expansion within the cell and even the rupture of the cell walls.

A further serious objection to the use of magnesium, especially in wafer-type cells, has been the tendency of magnesium when used as an anode to become perforated during discharge.

It is an object of the present invention to provide a structure for a dry cell battery utilizing magnesium anodes in which corrosion and perforation of the magnesium anodes are reduced to such a degree that satisfactory performance is obtained.

It is still further an object to prevent the destruction of the electrical connection between the magnesium anode of one cell and the cathode of an adjacent cell resulting from corrosion and perforation of the anode in the critical connection areas.

It is a further object to provide a magnesium electrode assembly which is adapted for the construction of duplex cell type batteries.

Other objects and advantages of the invention will become apparent from the following discussion and from the drawing in which:

FIG. 1 is a plan view of a duplex electrode assembly according to the present invention.

Figure 2:
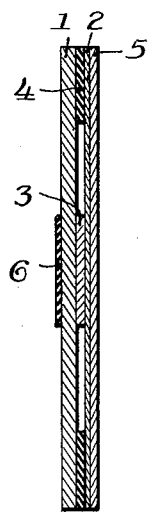
Figures 3, 5:
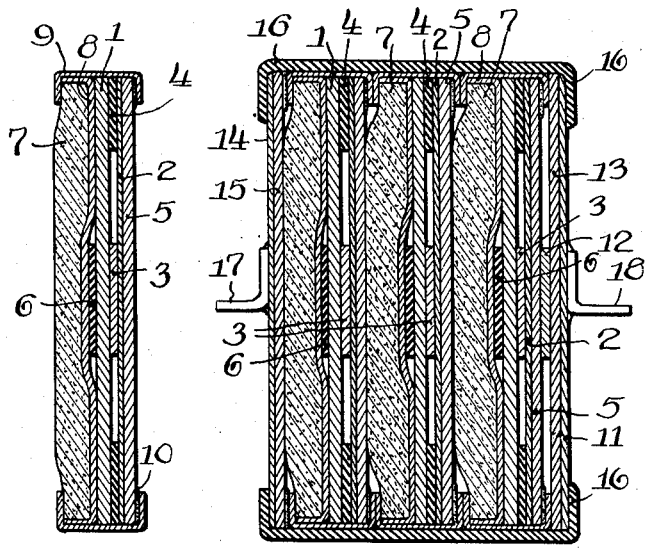
Figure 4:
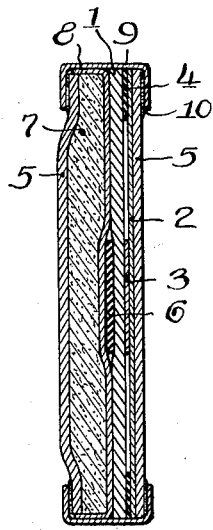

FIG. 2 is a cross-section of the assembly.
FIG. 3 is a cross-section of a duplex cell unit.
FIG. 4 is a cross-section of an individually operative type of cell unit, and
FIG. 5 is a cross-section of a battery composed of a plurality of duplex cell units.

In the duplex electrode structure of FIG. 1 and FIG. 2, a magnesium anode 1 is connected electrically to a metal foil sheet 2 serving as a vapor barrier, by means of a bead 3 of an electronically conductive composition. The conductive composition may be any of numerous such compositions disclosed in the prior art. A preferred composition is comprised of a mixture of finely divided silver powder in wax. This composition is disclosed in U.S. Patent No. 2,666,803. Another suitable composition is comprised of silver coated finely divided metal powder such as copper in wax. The conductive composition is applied to the magnesium anode preferably in the molten state. A similar bead may be placed on the metal foil sheet 2. The metal foil sheet 2 is cemented to the anode by a ring 4 of an adhesive material such as polyisobutylene or asphalt. The metal foil sheet 2 is preferably composed of copper, but may be composed of any other suitable electrically conductive metal which is capable of functioning as a liquid and vapor barrier.

A non-metallic carbonaceous conductive sheet or layer 5 is affixed to the metal foil 2. It is preferably in the form of a flexible film composed of graphite particles embedded in a plastic binder such as polyisobutylene. In an alternative form it may comprise a fabric coated and impregnated with a conductive paint comprised of graphite in a binder. In still another form, it may comprise a layer of a carbon-containing paint applied to the metal foil sheet 2. The functions of the conductive sheet 5 are to complete the conductive path between the metal foil sheet to which it is connected and the depolarizer cathode of an adjacent cell, and, further, to prevent chemical action of the depolarizer and the electrolyte on the magnesium anode or on the metal foil sheet 2. The conductive sheet 5 may be cemented, painted, or rolled onto the metal foil 2.

The metal foil sheet 2 is shown in the figure in a form where it is of sufficient size to cover the entire anode. However, although such a structure aids materially in protecting the surface of the anode from electrolytic action, for the purposes of the present invention it is necessary only that the foil sheet be sufficiently large to cover the bead of electronically conductive composition and to engage the ring of adhesive so that the critical area of the anode and the electrical connecting bead are completely sealed off from water vapor.

In the preferred form of the invention a disc 6 of a non-conductive material such as a pressure-sensitive adhesive tape comprised of polyvinyl chloride or polyethylene is additionally affixed to the center of the side of the anode which is to engage the separator of the cell, positioned directly over and of substantially the same size as the area on the other side of the anode engaging the electronic connection-providing bead 3. The tape disc or other similar insulating disc serves to prevent electrolytic action from taking place at this critical area. As a result the anode does not become perforated in this area during cell discharge, and the electrical intercell connection is not adversely affected.

A complete duplex cell unit is shown in FIG. 3, utilizing the duplex electrode structure of FIGS. 1 and 2. In addition to the duplex electrode structure, the cell unit contains a depolarizer element 7 in the form of a cake or pellet which is partially enclosed in a bibulous separator 8 composed of a material such as kraft paper, containing the cell electrolyte absorbed therein. The outer surface of the separator engages the anode 1. An electrolyte-resistant integument 9 in the form of a polyvinyl chloride sleeve forms an enclosure to contain all the elements of each cell unit. An adhesive ring 10 of a material such as polyisobutylene or asphalt causes the turned-over periphery of the sleeve 9 to adhere to the conductive film 5.

As an alternative arrangement, the cell unit may be constructed as a completely functional individual cell, as illustrated in FIG. 4. Although the various elements are substantially the same as in the unit shown in FIG. 3, the arrangement is sufficiently altered so that each unit can operate as an independent cell. As shown, a carbonaceous conductive sheet 5 is placed at each end of the cell. However, if desired, the sheet which engages the copper foil may be dispensed with. The copper foil of one cell will then engage the carbonaceous sheet of an adjacent cell when a plurality of cells are stacked to form a battery.

A plurality of duplex cell units such as illustrated in FIG. 3 or FIG. 4 may be combined in stacked relationship to form a battery as shown in FIG. 5. The individual cell units are so arranged that the depolarizer element 7 of one cell is in electrical contact engagement with the conductive film 5 of an adjacent cell. A negative terminal plate 11 comprised of a metal such as zinc or brass is connected to the negative terminal cell by means of a conductive bead 12 composed of silver wax. As shown in the drawing, a carbonaceous conductive sheet 13 is affixed to the terminal plate and interposed between the terminal plate 11 and the conductive bead 12 as an assembly expedient, but may be omitted if desired.

The positive terminal plate is comprised of a zinc or brass sheet 14 having a carbonaceous conductive layer 15 affixed thereto. The layer 15 makes electrical contact directly with the depolarizer mix cake 7 of the positive terminal cell, and additionally prevents the electrolyte or depolarizer material from reacting with the terminal plate.

A battery container 16 of a suitable material such as paper board encloses the battery, and is provided with terminal apertures to permit access to the terminal plates. Terminals 17 and 18 may be soldered or welded to the respective terminal plates.

Batteries may be prepared in similar manner from a plurality of complete cell units such as shown in FIG. 4.

The material used for the anode may be either pure magnesium or any suitable magnesium alloy. The anodes may be either cut or stamped from rolled sheet.

The depolarizer material may be comprised of about ninety parts manganese dioxide and ten parts of finely divided carbon such as acetylene black or graphite. The manganese dioxide and carbon are mixed together with an aqueous electrolyte to form an extrudible mixture. The mixture may be extruded through a nozzle having a cross-section substantially the same as the cross-section desired in the depolarizer core. The individual cores may be subsequently formed by cutting the extrusion into segments having the desired length. If so desired, the depolarizer cores may be formed by other methods known in the art, such as molding or pelleting.

An electrolyte suitable for use in the cells of the present invention may be comprised of 100 pounds of 41 percent magnesium bromide, 149 pounds of water, and 19 grams of lithium chromate crystals. The resulting solution contains 17% magnesium bromide, .017% lithium chromate, and 83.43% water.

The duplex electrode according to the present invention may be assembled by first melting a bead or globule of silver wax onto the center of one face of the magnesium anode. A ring of an adhesive which is resistant to the electrolyte is then placed on the anode surrounding the silver wax bead. The laminate comprised of copper foil having a conductive carbonaceous sheet rolled thereon is applied to the anode with the copper foil being placed over the adhesive and silver wax. A disc of a non-conductive pressure sensitive tape such as polyvinyl chloride, is placed on one surface of the anode directly over the area engaged on the other side by the silver wax, and of substantially the same area as that occupied by the silver wax bead.

A depolarizer slab prepared as described above is then placed inside the cup-shaped bibulous separator. The slab and separator are then arranged so that the separator engages the side of the anode having the insulating disc. An additional ring of adhesive is placed around the periphery of the outer surface of the conductive carbonaceous sheet, and the entire cell assembly placed inside a polyvinyl chloride sleeve. The lips of the sleeve are then pressed with heat over the corners and against the ends of the cell at both ends to form a self-contained unit. The edge of the sleeve which is pressed around the periphery of the conductive carbon sheet is sealed thereto by the adhesive ring to prevent the passage of electrolyte from the cell.

To form a battery, a plurality of cells are stacked one upon the other, all oriented in the same direction. A metal terminal having a conductive carbonaceous sheet affixed thereto is placed over the cell at the negative end, and a similar metal terminal is placed against the positive end, with the conductive carbonaceous sheet of the positive terminal engaging the depolarizer slab of the last cell. The metal terminals may have wires 17 and 18 soldered thereto. A container is then placed around the cells and the battery is sealed as by dipping in wax or by any of the various methods used in the art.

Cells made according to the present structure have a number of advantages over other wafer-type cells of the prior art utilizing magnesium anodes.

The primary advantage of the invention results from the fact that the combination of the metal foil sheet, the anode and the adhesive ring cooperate to form an airtight enclosure around the electronic connection, to the magnesium anode, such as the silver wax bead, and effectively prevents any electrolyte or vapor from attacking the connection between the bead and the anode. Moreover, in the improved embodiment, the insulating means, such as the tape disc, which is placed over the exposed surface of the magnesium anode and directly overlying the area occupied by the silver wax bead on the other surface, prevents electrolytic action on the anode at that critical area, and as a result, eliminates anodic perforation at that area and this prevents impairment of the intercell electronic connection during operation. In spite of its effectiveness, the present structure is easily and relatively inexpensively fabricated, and is adaptable to mass production methods.

Although the present invention has been described and shown in the drawings in only relatively few embodiments, many variations may be practiced by those skilled in the art without departing from the spirit and the scope of the invention as defined by the appended claims.

What is here claimed is:

1. A duplex electrode assembly for primary batteries comprising a sheet-form magnesium anode, a metal foil sheet, electronic connection-providing means interposed between and making contact engagement with a limited area of a surface of each of said anode and said metal foil sheet, a ring of an adhesive material interposed between said anode and said metal foil sheet completely encircling said electronic connection-providing means, causing said anode to adhere to one side of said sheet and sealing said electronic connection-providing means in the space between said anode and said metal foil sheet, and a conductive coating of a carbonaceous material in a resinous binder affixed to and substantially covering the other side of said metal foil sheet.

2. A duplex electrode for a primary electric battery comprising a sheet-form magnesium anode, a metal foil sheet, electronic connection-providing means interposed between and making contact engagement with a limited area of a surface of each of said anode and said metal foil sheet, a ring of an adhesive material interposed between said anode completely encircling said sheet electronic connection-providing means, causing said anode to adhere to one side of said metal foil sheet and sealing said electronic connection-providing means in the space between said anode and said metal foil sheet, means for preventing electrolytic action at a limited area of the side of said anode opposite the side engaging said electronic connection-providing means, said limited area being of substantially the same size as and directly overlying the area on the other side of said anode engaging said electronic connection-providing means, and a conductive coating of a carbonaceous material in a resinous binder affixed to the other side of said metal foil sheet.

3. A cell unit for primary batteries comprising a plurality of flat cell elements in stacked relationship comprised of a sheet-form magnesium anode, a metal foil sheet, electronic connection-providing means interposed between and making contact engagement with a limited area of the surface of each of said anode and said metal foil sheet, a ring of an adhesive material interposed between said anode and said metal foil sheet completely encircling said electronic connection-providing means, causing said anode to adhere to one side of said metal foil sheet and sealing said electronic connection-providing means in the space between said anode and said metal foil sheet, a layer of a conductive carbonaceous material in a resinous binder, a depolarizer cake, a bibulous separator having one surface engaging said anode and the other surface engaging said depolarizer unit, an electrolyte contained in said separator, and a non-conductive electrolyte-resistant integument enclosing said cell elements, said integument having means provided at each end of said cell unit for making electronic connection with said cell.

4. A cell unit according to claim 3 having means for preventing electrolytic action at a limited area of the side of said anode engaging said bibulous separator, said limited area being of substantially the same size as and directly overlying the area on the other side of said anode engaging said electronic connection-providing means.

5. A duplex cell unit for primary batteries comprising a plurality of flat cell elements in stacked relationship comprised of a sheet-form magnesium anode, a metal foil sheet, electronic connection-providing means interposed between and making contact engagement with a limited portion of the surface of each of said anode and said metal foil sheet, a ring of an adhesive material interposed between said anode and said metal foil sheet completely encircling said electronic connection-providing means, causing said anode to adhere to one side of said foil layer and sealing said electronic connection-providing means in the space between said anode and said metal foil sheet, a conductive coating of a carbonaceous material in a resinous binder affixed to and substantially covering the outer surface of said metal foil sheet, a depolarizer cake, a bibulous separator having one surface engaging said anode and the other surface engaging said depolarizer unit, an electrolyte contained in said separator, and a non-conductive electrolyte-resistant integument enclosing said cell elements, said integument having means provided at each end of said cell unit for enabling electronic connection to be made therewith.

6. A duplex cell unit for primary batteries comprising a plurality of flat cell elements in stacked relation comprised of a sheet-form magnesium anode, a metal foil sheet, electronic connection-providing means interposed between and making contact engagement with a limited portion of the surface of each of said anode and said metal foil sheet, a ring of an adhesive material interposed between said anode and said metal foil sheet completely encircling said electronic connection-providing means, causing said anode to adhere to one side of said metal foil sheet and sealing said electronic connection-providing means in the space between said anode and said metal foil sheet, a conductive coating of a carbonaceous material in a resinous binder affixed to and substantially covering the other side of said metal foil sheet, a depolarizer cake in contact engagement with said conductive coating, a bibulous separator having one surface engaging said anode and the other surface engaging said depolarizer unit, an electrolyte contained in said separator, means for preventing electrolytic action at a limited area of the side of said anode engaging said separator directly overlying and of substantially the same size as the area on the other side of said anode engaging said electronic connection-producing means, and a non-conductive electrolyte-resistant integument enclosing said cell elements, said integument having means provided at each end of said cell unit for enabling electronic connection to be made therewith.

7. A primary battery comprising a plurality of stacked cell units, each of said cell units having a plurality of flat cell elements in juxtaposed relationship comprised of a sheet-form magnesium anode, a metal foil sheet, electronic connection-providing means interposed between and making contact engagement with a limited area of a surface of each of said anode and said metal foil layer, a ring of an adhesive material interposed between said anode and said metal foil sheet completely encircling said electronic connection-providing means, causing said anode to adhere to one side of said metal foil sheet and sealing said electronic connection-providing means in the space between said anode and said metal foil sheet, a layer of a conductive carbonaceous material in a resinous binder, a depolarizer cake, a bibulous separator having one surface engaging said anode and the other surface engaging said depolarizer unit, an electrolyte contained in said separator, and a non-conductive electrolyte-resistant integument enclosing said cell elements and having means provided at each end of said cell unit for permitting electronic connection between adjacent cell units, a positive metallic terminal plate electronically engaging a terminal cell unit at one end of said battery, a negative metallic terminal plate electronically engaging a terminal cell unit at the other end of said battery, and an enclosure for said battery.

8. A primary battery according to claim 7 wherein each of said cell units is provided with means for preventing electrolytic action at a limited area of the side of said anode engaging said separator, said means directly overlying and being substantially the same size as the area on the other side of said anode engaging said electronic connection-providing means.

9. A primary battery comprising a plurality of stacked duplex cell units, each of said duplex cell units having a plurality of flat cell elements in juxtaposed relationship comprised of a sheet-form magnesium electrode, a metal foil sheet, electronic connection-providing means interposed between and making contact engagement with a limited area of a surface of each of said anode and said metal foil sheet, a ring of an adhesive material interposed between said anode and said metal foil layer completely encircling said electronic connection-providing means, causing said anode to adhere to one side of said foil layer and sealing said electronic connection-providing means in the space between said anode and said metal foil sheet, a conductive coating of a carbonaceous material in a resinous binder affixed to and substantially covering the other side of said metal foil sheet, a depolarizer cake, a bibulous separator having one surface engaging said anode and the other surface engaging said depolarizer cake, an electrolyte contained in said separator, a non-conductive electrolyte-resistant integument enclosing said cell elements and having means provided for permitting electronic connection between adjacent cell units, a positive terminal plate electronically connected to the terminal cell at one one of said battery, a negative terminal plate electronically connected to the terminal cell at the other end of said battery, and an enclosure for said battery.

10. A primary battery comprising a plurality of stacked duplex cell units, each of said duplex cell units having a plurality of flat cell elements in juxtaposed relationship comprised of a sheet-form magnesium electrode, a metal foil sheet, electronic connection-providing means interposed between and making contact engagement with a limited area of a surface each of said anode and said foil sheet, a ring of an adhesive material interposed between said anode and said foil sheet completely encircling said electronic connection-providing means, causing said anode to adhere to one side of said foil layer and sealing said electronic connection-providing means in the space between said anode and said metal foil sheet, a conductive coating of a carbonaceous material in a resinous binder affixed to and substantially covering the other side of said metal foil sheet, a depolarizer cake, a bibulous separator having one surface engaging said anode and the other surface engaging said depolarizer cake, an electrolyte contained in said separator, means for preventing electrolytic action at a limited area of the side of said anode engaging said separator directly overlying and of substantially the same size as the area on the other side of said anode engaging said electronic connection-providing means, a nonconductive electrolyte-resistant integument enclosing said cell elements and having means provided at each end of said cell unit for permitting electronic connection between said cell units, a positive terminal plate electronically connected to the terminal cell at one end of said battery, a negative terminal plate electronically connected to the terminal cell at the other end of said battery, and an enclosure for said battery.

11. A primary battery according to claim 10 wherein said electronic connection-providing means is a bead of a composition comprised of finely divided silver in a wax binder.

12. A primary battery according to claim 10 wherein said electronic connection-providing means is a bead of a composition comprised of silver-coated finely divided metal in a wax binder.

13. A primary battery according to claim 10 wherein said metal foil layer is comprised of copper.

References Cited in the file of this patent
UNITED STATES PATENTS

| | | |
|---|---|---|
| 2,666,803 | Kurlandsky | Jan. 19, 1954 |
| 2,826,626 | Bryant et al. | Mar. 11, 1958 |